(12) United States Patent
Shimizu et al.

(10) Patent No.: US 10,837,547 B2
(45) Date of Patent: Nov. 17, 2020

(54) OIL PRESSURE CONTROL DEVICE FOR VEHICLE AND OIL PRESSURE CONTROL METHOD

(71) Applicant: JATCO Ltd, Fuji-shi, Shizuoka (JP)

(72) Inventors: Yutaka Shimizu, Atsugi (JP); Shusaku Katakura, Fujisawa (JP); Yusuke Ota, Ebina (JP); Tomoyuki Koike, Kanagawa (JP); Yukiyoshi Inuta, Kanagawa (JP); Youko Yoshioka, Kanagawa (JP)

(73) Assignee: JATCO LTD, Fuji (JP)

( * ) Notice: Subject to any disclaimer, the term of this patent is extended or adjusted under 35 U.S.C. 154(b) by 256 days.

(21) Appl. No.: 15/561,470

(22) PCT Filed: Mar. 9, 2016

(86) PCT No.: PCT/JP2016/057416
§ 371 (c)(1),
(2) Date: Sep. 25, 2017

(87) PCT Pub. No.: WO2016/152534
PCT Pub. Date: Sep. 29, 2016

(65) Prior Publication Data
US 2018/0119800 A1 May 3, 2018

(30) Foreign Application Priority Data

Mar. 26, 2015 (JP) ................................. 2015-065276

(51) Int. Cl.
*B60W 10/30* (2006.01)
*F16H 61/00* (2006.01)
(Continued)

(52) U.S. Cl.
CPC ........... *F16H 61/0025* (2013.01); *B60K 6/48* (2013.01); *B60K 6/543* (2013.01); *B60W 10/30* (2013.01);
(Continued)

(58) Field of Classification Search
CPC ...... F04D 13/12; F04D 13/14; F04B 2205/05; F04B 49/022; F04B 49/08;
(Continued)

(56) References Cited

U.S. PATENT DOCUMENTS 6,390,947 B1    5/2002  Aoki et al.
9,080,618 B2 *  7/2015  Kawakami ............. F16D 48/02
(Continued)

FOREIGN PATENT DOCUMENTS

| JP | 2001-099282 A | 4/2001 |
| JP | 2003-240110 A | 8/2003 |
| JP | 2011-196501 A | 10/2011 |
| JP | 2011196501 A | * 10/2011 |

*Primary Examiner* — Charles G Freay
*Assistant Examiner* — Thomas Fink
(74) *Attorney, Agent, or Firm* — Foley & Lardner LLP

(57) ABSTRACT

An oil pressure control device has a mechanical oil pump (O/P) driven by a motor/generator (MG), an electric oil pump (M/O/P) driven by a sub motor (S/M) and a line pressure regulating valve (104). In a case where a state is changed from a state in which the motor/generator (MG) is stopped and the electric oil pump (M/O/P) is driven to a state in which the motor/generator (MG) is started and the electric oil pump (M/O/P) is stopped, when a total flow amount of a working fluid discharge flow amount of the mechanical oil pump (O/P) and a working fluid discharge flow amount of the electric oil pump (M/O/P) is equal to or greater than a pressure regulation limit flow amount of the pressure regulating valve (104), the working fluid discharge flow amount of the electric oil pump (M/O/P) is decreased.

5 Claims, 5 Drawing Sheets

(51) Int. Cl.
*B60K 6/48* (2007.10)
*B60K 6/543* (2007.10)
*F16H 59/18* (2006.01)
*F16H 59/40* (2006.01)
*F02D 29/02* (2006.01)
*F16H 63/50* (2006.01)
*B60W 20/00* (2016.01)
*B60W 20/19* (2016.01)
*F16H 61/662* (2006.01)
*F16H 59/36* (2006.01)

(52) U.S. Cl.
CPC ............ *B60W 20/00* (2013.01); *B60W 20/19* (2016.01); *F02D 29/02* (2013.01); *F16H 59/18* (2013.01); *F16H 59/40* (2013.01); *F16H 61/0031* (2013.01); *F16H 61/66259* (2013.01); *F16H 63/50* (2013.01); *B60Y 2200/92* (2013.01); *F16H 2059/366* (2013.01)

(58) Field of Classification Search
CPC ........ F04B 2207/042; F04B 2207/0421; F04B 2207/041; F04B 2207/0411; F04B 2205/06; F04B 49/22; F02D 29/02; F16H 59/40; F16H 59/08; F16H 63/50; F16H 2059/366; B60W 20/00; B60W 10/30; B60K 6/543; B60Y 2200/92
See application file for complete search history.

(56) References Cited

U.S. PATENT DOCUMENTS

| | | | |
|---|---|---|---|
| 9,616,883 B2* | 4/2017 | Nagamine | F16H 61/0031 |
| 2002/0053362 A1* | 5/2002 | Frei | G05D 16/2024 |
| | | | 137/596.17 |
| 2002/0091034 A1 | 7/2002 | Nakamori et al. | |
| 2003/0171867 A1* | 9/2003 | Nakamori | B60W 10/30 |
| | | | 701/54 |
| 2004/0179962 A1* | 9/2004 | Hopper | F16H 61/0031 |
| | | | 417/426 |
| 2005/0159269 A1* | 7/2005 | Godecke | F16H 61/6648 |
| | | | 476/10 |
| 2009/0074590 A1* | 3/2009 | Tsuda | B60W 20/40 |
| | | | 417/3 |
| 2011/0088990 A1* | 4/2011 | Shimizu | F16H 61/0206 |
| | | | 192/85.01 |
| 2012/0103709 A1* | 5/2012 | Mochiyama | F16H 61/0031 |
| | | | 180/65.21 |
| 2013/0319366 A1* | 12/2013 | Karasawa | F01M 1/02 |
| | | | 123/196 R |
| 2014/0294599 A1* | 10/2014 | Wi | F16H 61/0021 |
| | | | 417/2 |
| 2015/0167836 A1* | 6/2015 | Long | B60K 6/48 |
| | | | 60/428 |
| 2015/0239452 A1* | 8/2015 | Iwasa | B60K 6/48 |
| | | | 701/22 |
| 2016/0017994 A1* | 1/2016 | Suzumura | F16H 61/66272 |
| | | | 701/55 |
| 2017/0350503 A1* | 12/2017 | Truong | F16H 61/0021 |

* cited by examiner

OIL PRESSURE CONTROL DEVICE FOR VEHICLE AND OIL PRESSURE CONTROL METHOD

The present invention relates to an oil pressure control device for a vehicle which has a first oil pump driven by a travel drive source and a second oil pump driven by an electric motor.

BACKGROUND ART

There has been known an oil pressure control device for a vehicle which has a first oil pump driven by a travel drive source and a second oil pump driven by an electric motor that is driven during an automatic stop of the travel drive source, and which stops the second oil pump by and according to a restart of the travel drive source (for example, Patent Document 1).

This conventional oil pressure control device stops the second oil pump when a predetermined time by which it is possible to judge that a required pressure (a required line pressure) is secured by a first oil pump discharge pressure elapses after the drive of the first oil pump is started by the restart of the travel drive source.

In this case, however, although the required line pressure can be secured, a drive time of the second oil pump becomes long, then there arises a problem of increasing a power consumption amount.

On the other hand, if a stop timing of the second oil pump is too early, the first oil pump discharge pressure is not sufficiently produced and the required line pressure cannot be secured, then a slip might occur at a power transmission member such as a clutch and a continuously variable transmission.

An object of the present invention is therefore to provide an oil pressure control device for the vehicle which is capable of suppressing the power consumption amount of the electric motor that drives the second oil pump while securing the required line pressure when stopping the second oil pump.

CITATION LIST

Patent Document

Patent Document 1: Japanese Unexamined Patent Application Publication No. JP2001-099282

SUMMARY OF THE INVENTION

An oil pressure control device for a vehicle of the present invention comprises; a first oil pump, a second oil pump, a pressure regulating valve and an oil pressure controller.

The first oil pump is driven by a travel drive source and discharges working fluid.

The second oil pump is driven by an electric motor that is provided separately from the travel drive source and discharges working fluid.

The pressure regulating valve regulates a first oil pump discharge pressure and/or a second oil pump discharge pressure.

In a case where, during pressure regulation by the pressure regulating valve, the oil pressure controller changes a state from a state in which the travel drive source is stopped and the second oil pump is driven to a state in which the travel drive source is started and the second oil pump is stopped, the an oil pressure controller is configured to, when a total flow amount of a working fluid discharge flow amount of the first oil pump and a working fluid discharge flow amount of the second oil pump is equal to or greater than a pressure regulation limit flow amount of the pressure regulating valve, decrease the working fluid discharge flow amount of the second oil pump.

In the oil pressure control device for a vehicle of the present invention, in the case where, during pressure regulation by the pressure regulating valve, a state is changed from the state in which the travel drive source is stopped and the second oil pump is driven to the state in which the travel drive source is started and the second oil pump is stopped, when the total flow amount of the working fluid discharge flow amount of the first oil pump and the working fluid discharge flow amount of the second oil pump is equal to or greater than the pressure regulation limit flow amount of the pressure regulating valve, the working fluid discharge flow amount of the second oil pump is decreased.

Here, a state in which the total flow amount is equal to or greater than the pressure regulation limit flow amount of the pressure regulating valve is a state in which a supply oil amount to the pressure regulating valve is excessive, and this means that the working fluid discharge flow amount of the first oil pump is sufficiently increased. With this, even if the working fluid discharge flow amount of the second oil pump is decreased, the working fluid amount required to secure the required line pressure is covered or secured by the total flow amount.

Further, when decreasing the working fluid discharge flow amount of the second oil pump at a timing when the total flow amount is equal to or greater than the pressure regulation limit flow amount of the pressure regulating valve, the working fluid discharge flow amount of the second oil pump can be decreased before the required line pressure can be securedby only the first oil pump discharge pressure.

As a consequence, an unnecessary drive of the second oil pump can be suppressed, and power consumption amount of the electric motor that drives the second oil pump can be suppressed while securing the required line pressure.

EMBODIMENTS FOR CARRYING OUT THE INVENTION

Figure 1:
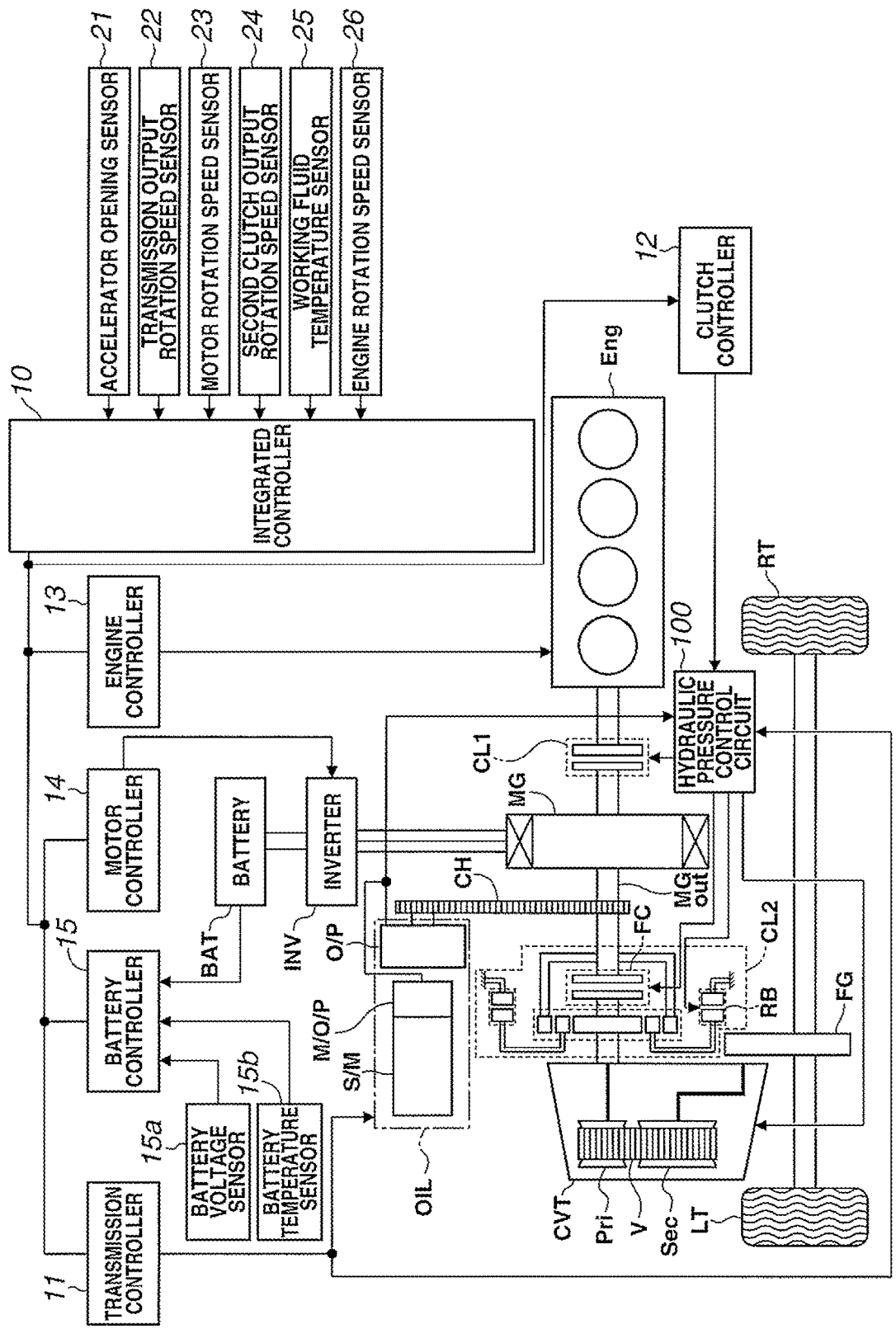
FIG. 1 is a general system diagram showing a hybrid vehicle to which a control device of an embodiment is applied.

In the following description, a vehicle oil pressure control device of the present invention will be explained on the basis of an embodiment shown in the drawings.

Embodiment

First, a configuration of the vehicle oil pressure control device of the embodiment will be separately explained by [General system configuration of hybrid vehicle], [Detailed configuration of hydraulic pressure control circuit] and [Electric oil pump stop process].

[General System Configuration of Hybrid Vehicle]

FIG. 1 is a general system diagram showing a hybrid vehicle (an example of vehicles) to which the control device of the embodiment is applied. In the following description, a general system configuration of the hybrid vehicle of the embodiment will be explained with reference to FIG. 1.

The vehicle oil pressure control device of the embodiment is applied to the hybrid vehicle shown in FIG. 1. A drive system of this hybrid vehicle has an engine Eng, a first clutch CL1, a motor/generator MG, a second clutch CL2, a continuously variable transmission CVT, a final gear FG, a left driving wheel LT and a right driving wheel RT.

The engine Eng is a travel drive source, and has, for instance, a lean-burn engine structure. This engine Eng is controlled so that an engine torque is identical with a command value by controls of an intake air quantity by a throttle actuator, a fuel injection amount by an injector and an ignition timing by an ignition plug. The engine Eng is started by a motor torque from the motor/generator MG with the first clutch CL1 engaged.

The first clutch CL1 is interposed between the engine Eng and the motor/generator MG. As the first clutch CL1, for instance, a dry clutch that is normally disengaged (i.e. normally open) by an urging force of a diaphragm spring is used. The first clutch CL1 realizes full engagement/half engagement/disengagement between the engine Eng and the motor/generator MG. If the first clutch CL1 is in a fully engaged state, a motor torque and the engine torque are transmitted to the second clutch CL2. If the first clutch CL1 is in a disengaged state, only the motor torque is transmitted to the second clutch CL2. Here, a control of the full engagement/the half engagement/the disengagement is performed by a stroke control for a hydraulic actuator.

The motor/generator MG has an alternating current synchronous motor structure as the travel drive source. The motor/generator MG realizes a drive torque control and a rotation speed control at vehicle start or during vehicle travel, and realizes recovery or collection of a vehicle kinetic energy to a battery BAT by a regenerative brake control at braking or during deceleration. Further, the motor/generator MG is used here also as an engine start motor.

The second clutch CL2 is a frictional engagement element that is interposed between the motor/generator MG and the left and right driving wheels LT, RT, and is a start clutch (a power transmission member) that is engaged at the vehicle start and transmits a driving force of the travel drive source (the engine Eng and/or the motor/generator MG) to the left and right driving wheels LT, RT.

Here, this second clutch CL2 is formed by a hydraulically operated wet multiple disc clutch. Full engagement/slip engagement/disengagement of the second clutch CL2 are controlled by a second clutch pressure. The second clutch CL2 of the embodiment is also used as a forward clutch FC and a reverse brake RB that are provided in a forward-reverse switching mechanism by a planetary gear of the continuously variable transmission CVT. That is, at a forward travel of the vehicle, the forward clutch FC is the second clutch CL2, whereas at a reverse of the vehicle, the reverse brake RB is the second clutch CL2.

The continuously variable transmission CVT is a belt type continuously variable transmission that has a primary pulley Pri, a secondary pulley Sec and a pulley belt V wound around these primary pulley Pri and secondary pulley Sec. The continuously variable transmission CVT is a power transmission member that transmits the driving force of the travel drive source (the engine Eng and/or the motor/generator MG) to the left and right driving wheels LT, RT. Pulley widths of the primary pulley Pri and the secondary pulley Sec are changed with the pulley belt V sandwiched and held by being supplied with respective hydraulic pressures (respective oil pressures), then a transmission ratio (a pulley ratio) is freely controlled by change of diameters of surfaces of the primary pulley Pri and the secondary pulley Sec sandwiching and holding the pulley belt V.

Further, an input gear of a mechanical oil pump O/P (a first oil pump) is connected to a motor output shaft MGout of the motor/generator MG through a chain CH. This mechanical oil pump is an oil pump that is driven by the travel drive source, basically, by a rotation driving force of the motor/generator MG, and supplies the hydraulic pressure. For instance, a gear pump, a vane pump etc. are used as the mechanical oil pump. This mechanical oil pump O/P is configured to allow discharge of working fluid regardless of a rotation direction of the motor/generator MG.

Here, an electric oil pump M/O/P (a second oil pump) driven by a rotation driving force of a sub motor S/M (an electric motor), which is provided separately from the motor/generator MG, and supplying the hydraulic pressure is further provided.

This electric oil pump M/O/P has a three-phase alternating current structure. The electric oil pump M/O/P can control a discharge flow amount of the working fluid by a rotation speed control.

These mechanical oil pump O/P and electric oil pump M/O/P are an oil pressure supply source OIL that produces a working fluid pressure (a control pressure) supplied to the first and second clutches CL1, CL2 and the continuously variable transmission CVT. In this oil pressure supply source OIL, when a discharge flow amount from the mechanical oil pump O/P is sufficient, by stopping the sub motor S/M, the electric oil pump M/O/P is stopped. When the discharge flow amount from the mechanical oil pump O/P is decreased, by driving the sub motor S/M, the electric oil pump M/O/P is driven, then the working fluid from this electric oil pump M/O/P is also discharged.

This hybrid vehicle has a 1-motor-2-clutch drive system formed by the first clutch CL1, the motor/generator MG and the second clutch CL2. As main drive modes by this drive system, the hybrid vehicle has "EV mode" and "HEV mode".

The "EV mode" is an electric vehicle mode in which the first clutch CL1 is disengaged, the second clutch CL2 is engaged and the travel drive source is only the motor/generator MG.

The "HEV mode" is a hybrid vehicle mode in which the first and second clutches CL1, CL2 are each engaged and the travel drive source is the engine Eng and the motor/generator MG.

A control system of the hybrid vehicle of the embodiment has, as shown in FIG. 1, an inverter INV, the battery BAT, an integrated controller 10, a transmission controller 11, a clutch controller 12, an engine controller 13, a motor controller 14 and a battery controller 15.

The inverter INV carries out a DC/AC conversion, and produces a drive current of the motor/generator MG. Further, by reversing a phase of the produced drive current, an output rotation of the motor/generator MG is reversed.

The battery BAT is a rechargeable secondary battery. The battery BAT supplies power to the motor/generator MG, and also is charged with power that is recovered or collected by the motor/generator MG.

The integrated controller 10 calculates a target driving torque according to driver's required driving force from a battery state (which is inputted from the battery controller 15), an accelerator opening (which is detected by an accelerator opening sensor 21) and a vehicle speed (which is a value synchronized with a transmission output rotation speed, and which is detected by a transmission output rotation speed sensor 22). Then, on the basis of this calculation result, the integrated controller 10 calculates a command value for each actuator (the motor/generator MG, the engine Eng, the first clutch CL1, the second clutch CL2 and the continuously variable transmission CVT), and sends the command values to the controller 11 to 15.

This integrated controller 10 is a hydraulic pressure controller (an oil pressure controller) that, during pressure regulation by an after-mentioned line pressure regulating valve 104, shifts a state from a state in which both the engine Eng and the motor/generator MG stop and the electric oil pump M/O/P is driven to a state in which the electric oil pump M/O/P is stopped by starting the engine Eng and/or the motor/generator MG.

The transmission controller 11 performs a transmission control (a speed-change control) so as to achieve a transmission command from the integrated controller 10. This transmission control is carried out by controlling hydraulic pressures supplied to the primary pulley Pri and the secondary pulley Sec of the continuously variable transmission CVT with a line pressure PL supplied through a hydraulic pressure control circuit 100 being an initial pressure.

Surplus pressures produced when producing the hydraulic pressure supplied to the primary pulley Pri from the line pressure PL and the hydraulic pressure supplied to the secondary pulley Sec from the line pressure PL are fed for cooling and lubrication of the first clutch CL1 and the second clutch CL2.

The clutch controller 12 inputs a second clutch input rotation speed (which is detected by a motor rotation speed sensor 23), a second clutch output rotation speed (which is detected by a second clutch output rotation speed sensor 24) and a clutch oil temperature (which is detected by a working fluid temperature sensor 25). Further, this clutch controller 12 performs a first clutch control and a second clutch control so as to achieve a first clutch control command and a second clutch control command from the integrated controller 10. The first clutch control is carried out by controlling a hydraulic pressure supplied to the first clutch CL1 with a line pressure PL supplied through the hydraulic pressure control circuit 100 being an initial pressure. The second clutch control is carried out by controlling a hydraulic pressure supplied to the second clutch CL2 with a line pressure PL supplied through the hydraulic pressure control circuit 100 being an initial pressure.

Surplus pressures produced when producing the hydraulic pressure supplied to the first clutch CL1 from the line pressure PL and the hydraulic pressure supplied to the second clutch CL2 from the line pressure PL are fed for cooling and lubrication of the first clutch CL1 and the second clutch CL2.

Here, a circuit for supplying the control pressure to the primary pulley Pri and the secondary pulley Sec of the continuously variable transmission CVT and the second clutch CL2 with the line pressure PL being the initial pressure is called a "transmission mechanism hydraulic system Sup". Further, a circuit for performing the cooling and lubrication of the second clutch CL2 is called a "transmission mechanism cooling/lubrication system Lub" (see FIG. 2).

The engine controller 13 inputs an engine rotation speed (which is detected by an engine rotation speed sensor 26), and performs a torque control of the engine Eng so as to achieve an engine torque command value corresponding to a target engine torque from the integrated controller 10.

The motor controller 14 inputs a motor rotation speed (which is detected by the motor rotation speed sensor 23), and performs a control of the motor/generator MG so as to achieve a motor torque command value corresponding to a target motor torque and a motor rotation speed command value from the integrated controller 10.

The battery controller 15 controls a charge state of the battery BAT, and sends its information to the integrated controller 10. The charge state of the battery BAT is calculated according to a power supply voltage detected by a battery voltage sensor 15a and a battery temperature detected by a battery temperature sensor 15b.

[Detailed Configuration of Hydraulic Pressure Control Circuit]

Figure 2:
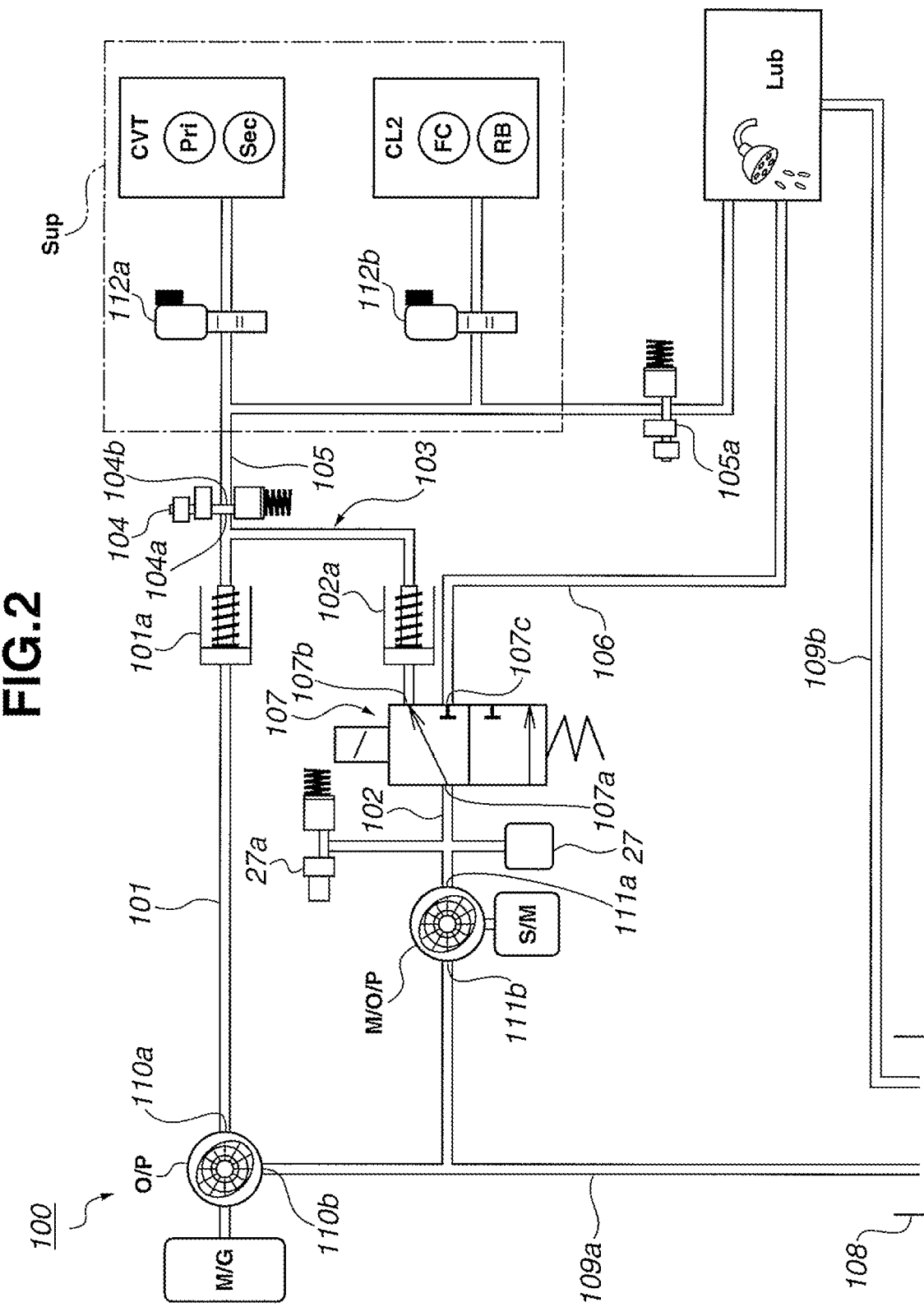
FIG. 2 is a drawing of a hydraulic circuit showing a hydraulic pressure control circuit provided in the hybrid vehicle of the embodiment.

FIG. 2 is a drawing of a hydraulic circuit showing the hydraulic pressure control circuit provided in the hybrid vehicle of the embodiment. In the following description, a detailed configuration of the hydraulic pressure control circuit will be explained with reference to FIG. 2.

The hydraulic pressure control circuit 100 regulates a discharge pressure of the oil pressure supply source OIL formed by the mechanical oil pump O/P and the electric oil pump M/O/P to the line pressure PL, and supplies it to the transmissionmechanismhydraulic system Sup. Further, the hydraulic pressure control circuit 100 supplies the surplus pressure produced when supplying the hydraulic pressure to the transmission mechanism hydraulic system Sup to the transmission mechanism cooling/lubrication system Lub. Furthermore, in this hydraulic pressure control circuit 100, by switching a switching valve 107, the working fluid discharged from the electric oil pump M/O/P is directly supplied to the transmission mechanism cooling/lubrication system Lub.

That is, the hydraulic pressure control circuit 100 of the embodiment has, as shown in FIG. 2, the mechanical oil pump O/P, the electric oil pump M/O/P, a first oil passage 101, a first flapper valve 101a, a second oil passage 102, a second flapper valve 102a, a third oil passage 103, the line pressure regulating valve 104, a line pressure oil passage 105, a cooling system oil passage 106 and the switching valve 107.

Regarding the mechanical oil pump O/P, the first oil passage 101 is connected to a discharge port 110a of the mechanical oil pump O/P, and a suction circuit 109a that sucks the working fluid recovered in an oil pan 108 is connected to a suctionport 111b of the mechanical oil pump O/P. This mechanical oil pump O/P is driven by rotation drive of the travel drive source (basically, the motor/generator MG), and sucks the working fluid from the oil pan 108 through the suction circuit 109a, then discharges the working fluid to the first oil passage 101. A discharge flow amount at this time is dependent on a rotation speed of the travel drive source.

Regarding the electric oil pump M/O/P, the second oil passage 102 is connected to a discharge port 111a of the electric oil pump M/O/P, and the suction circuit 109a that sucks the working fluid recovered in the oil pan 108 is connected to a suction port 111b of the electric oil pump M/O/P. This electric oil pump M/O/P is driven by rotation drive of the sub motor S/M, and sucks the working fluid from the oil pan 108 through the suction circuit 109a, then discharges the working fluid to the second oil passage 102.

Here, a discharge flow amount of the electric oil pump M/O/P is dependent on a pump rotation speed. That is, the flow amount of the working fluid discharged from the electric oil pump M/O/P is fixed by one rotation of the electric oil pump M/O/P. The pump rotation speed and the pump discharge flow amount have a proportional relationship up to a certain rotation speed (up to a certain flow amount).

One end of the first oil passage 101 is connected to the discharge port 110a of the mechanical oil pump O/P, and the other end is provided with the first flapper valve 101a. This first oil passage 101 is an oil passage where the working fluid discharged from the mechanical oil pump O/P flows. A hydraulic pressure (hereinafter, called a "first pressure P1") of this first oil passage 101 is a hydraulic pressure (a first oil pump discharge pressure) supplied from the mechanical oil pump O/P. The first oil passage 101 communicates with the third oil passage 103 when the first flapper valve 101a opens.

One end of the second oil passage 102 is connected to the discharge port 111a of the electric oil pump M/O/P, and the other end is provided with the second flapper valve 102a. This second oil passage 102 is an oil passage where the working fluid discharged from the electric oil pump M/O/P flows. A hydraulic pressure (hereinafter, called a "second pressure P2") of this second oil passage 102 is a hydraulic pressure (a second oil pump discharge pressure) supplied from the electric oil pump M/O/P. The second oil passage 102 communicates with the third oil passage 103 when the second flapper valve 102a opens.

At some midpoint of this second oil passage 102, the switching valve 107 is provided. That is, the second oil passage 102 is split at the midpoint, and one split passage is connected to a switching valve input port 107a of the switching valve 107, and the other split passage is connected to a switching valve output port 107b of the switching valve 107.

Further, the second oil passage 102 is provided with a second pressure sensor 27 that detects the second pressure P2 and a pressure leak valve 27a. When the second pressure P2 checked by the second pressure sensor 27 reaches a predetermined relief pressure Pre, the pressure leak valve 27a opens, and the working fluid in the second oil passage 102 is drained.

The first flapper valve 101a is a valve that prevents a back flow of the working fluid toward the mechanical oil pump O/P. The first flapper valve 101a has such a characteristic that when the first pressure P1 is greater than a hydraulic pressure (hereinafter, called a "third pressure P3") of the third oil passage 103, the first flapper valve 101a opens. The second flapper valve 102a is a valve that prevents a back flow of the working fluid toward the electric oil pump M/O/P. The second flapper valve 102a has such a characteristic that when the second pressure P2 is greater than the third pressure P3, the second flapper valve 102a opens.

Here, a magnitude of the third pressure P3 is determined by a higher pressure of the first pressure P1 and the second pressure P2. That is, one of the first and second flapper valves 101a and 102a, which corresponds to the higher pressure of the first pressure P1 and the second pressure P2, opens, and the other closes. With this valve operation, the third pressure P3 becomes equal to the pressure of the side where the flapper valve opens.

Here, when there is no pressure difference between the first pressure P1 and the second pressure P2, both of the first and second flapper valves 101a and 102a open at the same opening degree. Then, when either one of the first pressure P1 or the second pressure P2 becomes higher from the no pressure difference state, the opening degree of the flapper valve corresponding to the higher pressure is gradually large according to the pressure difference, whereas the other flapper valve gradually closes.

One of the third oil passage 103 branches off into two, and one of the branch is connected to the first flapper valve 101a, and the other is connected to the second flapper valve 102a, thereby allowing inflow of the working fluid from both of the first oil passage 101 and the second oil passage 102. The other end of the third oil passage 103 is connected to an input port 104a of the line pressure regulating valve 104. That is, this third oil passage 103 is an oil passage where the working fluid discharged from the oil pressure supply source OIL (the mechanical oil pump O/P and/or the electric oil pump M/O/P) flows. The third pressure P3 that is the hydraulic pressure of this third oil passage 103 is the initial pressure of the line pressure PL that is regulated by the line pressure regulating valve 104.

The line pressure regulating valve 104 is a pressure regulating valve that regulates the third pressure P3 and produces the line pressure PL supplied to the transmission mechanism hydraulic system Sup. That is, this line pressure regulating valve 104 performs the pressure regulation (pressure control) so that the first pressure P1 and/or the second pressure P2 are a target pressure regulation value.

The third oil passage 103 is connected to the input port 104a of this line pressure regulating valve 104, and the line pressure oil passage 105 connecting to the transmission mechanism hydraulic system Sup is connected to an output port 104b of this line pressure regulating valve 104. In the line pressure regulating valve 104, by moving a spool by a command value from the integrated controller 10, the working fluid in the third oil passage 103 escapes (is drained) to a drain circuit (not shown), thereby regulating the line pressure PL.

Here, in the line pressure regulating valve 104, an upper limit of an escaping amount (a draining amount) of the working fluid to the drain circuit is fixed by an opening area etc. of a drain port of the line pressure regulating valve 104 where the working fluid is drained. Because of this, if an incoming working fluid from the input port 104a is excessive and the escaping amount (the draining amount) required to regulate the line pressure PL to the target pressure regulation value exceeds the upper limit of the escaping amount (the draining amount) of the line pressure regulating valve 104, the working fluid cannot be drained out, then an actual line pressure $PL_R$ (an actual pressure of the line pressure oil passage 105) exceeds the target pressure regulation value.

The line pressure oil passage 105 is an oil passage for supplying the line pressure PL regulated by the line pressure regulating valve 104 to the transmission mechanism hydraulic system Sup. The line pressure oil passage 105 is provided with a pressure regulating valve 105a, then a surplus pressure obtained by subtracting a required pressure for the transmission mechanism hydraulic system Sup from the line pressure PL escapes (is supplied) to the transmission mechanism cooling/lubrication system Lub.

Further, the line pressure oil passage 105 is provided with a line pressure sensor 28 that detects the line pressure PL (the actual line pressure $PL_R$). The line pressure PL regulated by the line pressure regulating valve 104 is checked by this line pressure sensor 28.

One end of the cooling system oil passage 106 is connected to a cooling side port 107c of the switching valve 107, and the other end is connected to the transmission mechanism cooling/lubrication system Lub. When the switching valve 107 is switched to a cooling mode, the working fluid discharged from the electric oil pump M/O/P is supplied to the transmission mechanism cooling/lubrication system Lub.

Here, the working fluid used in the transmission mechanism cooling/lubrication system Lub is recovered or collected in the oil pan 108 through a drain circuit 109b.

The switching valve 107 is provided on the second oil passage 102. The switching valve 107 supplies the working fluid discharged from the electric oil pump M/O/P to the third oil passage 103 and supplies the working fluid discharged from the electric oil pump M/O/P to the transmission mechanism cooling/lubrication system Lub on the basis of a switching command from the integrated controller 10.

That is, this switching valve 107 has an ON·OFF solenoid and a switching valve. Then, when the switching valve input port 107a communicates with the switching valve output port 107b, the second oil passage 102 is fully opened. When the switching valve input port 107a communicates with the cooling side port 107c, the second oil passage 102 is switched to the cooling system oil passage 106 (the second oil passage 102 communicates with the cooling system oil passage 106).

The transmission mechanism hydraulic system Sup has a transmission pressure regulating valve 112a provided on the line pressure oil passage 105 and a second clutch pressure regulating valve 112b provided on the line pressure oil passage 105. A hydraulic pressure supplied to the primary pulley Pri and the secondary pulley Sec is regulated with the line pressure PL being an initial pressure by the transmission pressure regulating valve 112a, then pressure supply to the primary pulley Pri and the secondary pulley Sec is carried out. Also, a hydraulic pressure supplied to the forward clutch FC and the reverse brake RB is regulated with the line pressure PL being an initial pressure by the second clutch pressure regulating valve 112b, then pressure supply to the forward clutch FC and the reverse brake RB is carried out.

[Electric Oil Pump Stop Process]

Figure 3:
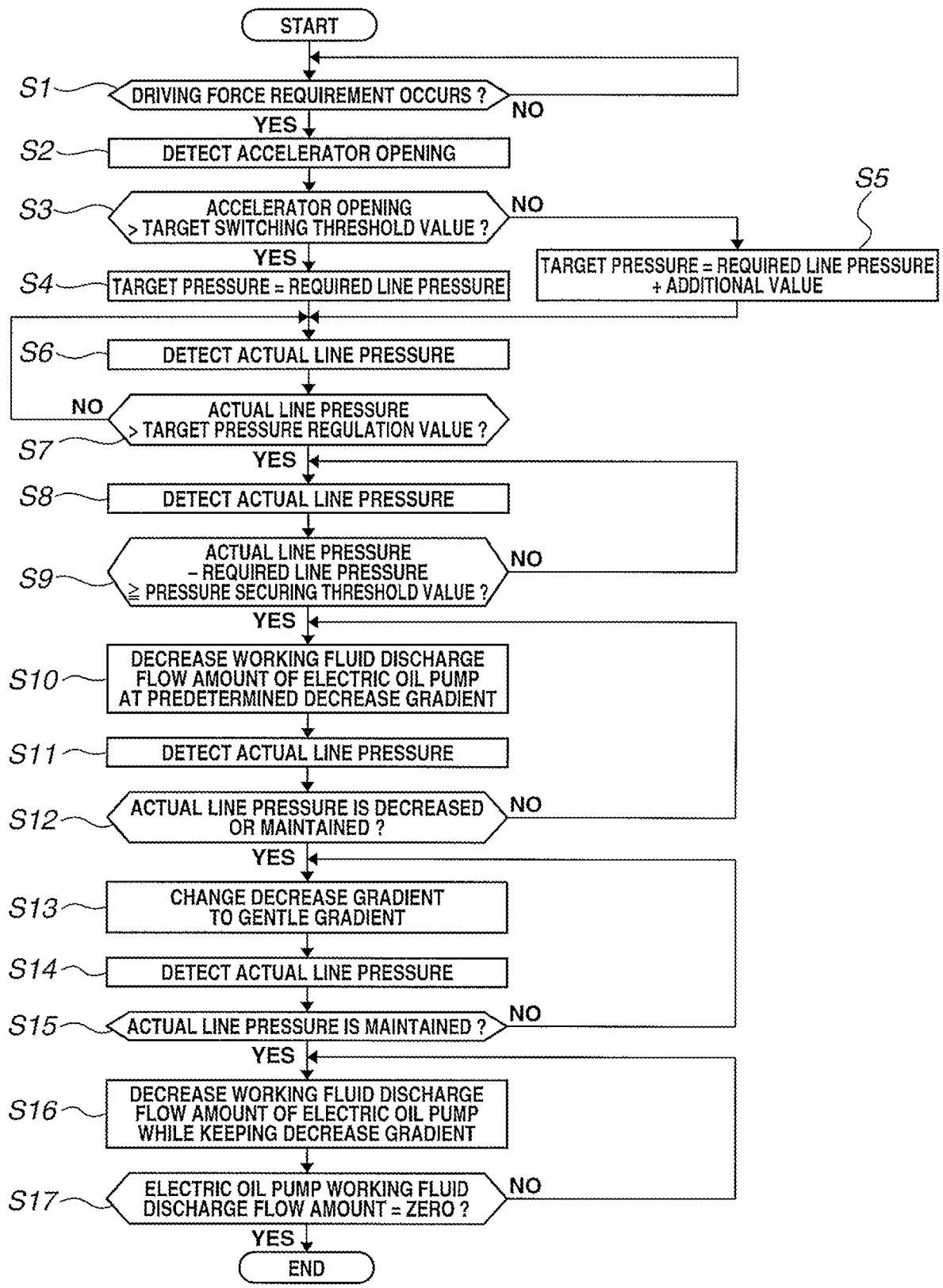
FIG. 3 is a flow chart showing an electric oil pump stop process executed by an integrated controller of the embodiment.

FIG. 3 is a flow chart showing an electric oil pump stop process executed by the integrated controller of the embodiment. In the following description, each step shown in FIG. 3, showing the electric oil pump stop process, will be explained. Here, as a prerequisite for the electric oil pump stop process, the electric oil pump stop process is executed when an idle-stop control by which the travel drive source (the engine Eng and the motor/generator MG) and the sub motor S/M are all stopped starts.

At step S1, a judgment is made as to whether or not a driving force requirement from a driver occurs. IF YES (the driving force requirement occurs), the pressure supply from the oil pressure supply source OIL is necessary, and the routine proceeds to step S2. If NO (the driving force requirement does not occur), the idle-stop control is continued, and step S1 is repeated.

Here, the occurrence of the driving force requirement is judged by an occurrence of an accelerator pedal depressing operation.

At step S2, after judging that the driving force requirement occurs at step S1, the accelerator opening is detected, and the routine proceeds to step S3.

Here, the accelerator opening is detected by the accelerator opening sensor 21. At this time, the travel drive source (the engine Eng, the motor/generator MG) is started according to driver's required driving force that is indicated by the detected accelerator opening. Here, either one or both of the engine Eng and the motor/generator MG is driven as the travel drive source, which is determined according to the required driving force.

At step S3, subsequent to the detection of the accelerator opening at step S2, a judgment is made as to whether or not the accelerator opening detected at step S2 is greater than a predetermined target switching threshold value $APO_{th}$. If YES (the accelerator opening>the target switching threshold value $APO_{th}$), this is judged to be a high opening degree start, and the routine proceeds to step S4. If NO (the accelerator opening≤the target switching threshold value $APO_{th}$), this is judged to be a low opening degree start, and the routine proceeds to step S5.

Here, the "target switching threshold value $APO_{th}$" is a threshold value to determine (or distinguish) whether an increase speed (a change speed) of a drive source torque (the engine torque, the motor torque) after the start of the travel drive source is fast (high) or slow (low). The target switching threshold value $APO_{th}$ is arbitrarily set. If the accelerator opening is greater than this predetermined target switching threshold value $APO_{th}$, it is judged that the increase speed of the drive source torque is fast (high). If the accelerator opening is equal to or less than this predetermined target switching threshold value $APO_{th}$, it is judged that the increase speed of the drive source torque is slow (low).

At step S4, subsequent to the judgment of the accelerator opening>the target switching threshold value $APO_{th}$ at step S3, a target value (a target pressure $PL_t$) of the second pressure P2 that is the hydraulic pressure supplied from the electric oil pump M/O/P is set to a "required line pressure $PL_{ne}$", and the electric oil pump M/O/P is started by driving the sub motor S/M, and further the target pressure regulation value by the line pressure regulating valve 104 is set to the "required line pressure $PL_{ne}$" that is the target pressure $PL_t$ of the second pressure P2, then the routine proceeds to step S6.

Here, by setting the target pressure $PL_t$ of the second pressure P2 to the "required line pressure $PL_{ne}$", the working fluid discharge amount (which is proportional to the rotation speed) of the electric oil pump M/O/P is controlled so as to maintain the second pressure P2 at the "required line pressure $PL_{ne}$" (=the target pressure $PL_t$).

Here, the "required line pressure $PL_{ne}$" is a minimum pressure required to properly control the power transmission member (the second clutch CL2, the continuously variable transmission CVT) disposed on a driving force transmission line from the travel drive source (the engine Eng and the motor/generator MG) to the left and right driving wheels LT, RT. The "required line pressure $PL_{ne}$" is changed in proportion to the driver's required driving force indicated by the accelerator opening.

At step S5, subsequent to the judgment of the accelerator opening≤the target switching threshold value $APO_{th}$ at step S3, the target value (the target pressure $PL_t$) of the second pressure P2 that is the hydraulic pressure supplied from the electric oil pump M/O/P is set to a value (the "required line pressure $PL_{ne}$+an additional value α") obtained by adding a predetermined additional value α to the required line pressure $PL_{ne}$, and the electric oil pump M/O/P is started by driving the sub motor S/M, and further the target pressure regulation value by the line pressure regulating valve 104 is set to the "required line pressure $PL_{ne}$+additional value α" that is the target pressure $PL_t$ of the second pressure P2, then the routine proceeds to step S6.

Here, by setting the target pressure $PL_t$ of the second pressure P2 to the "required line pressure $PL_{ne}$+additional value α", the working fluid discharge amount (which is proportional to the rotation speed) of the electric oil pump M/O/P is controlled so as to maintain the second pressure P2 at the "required line pressure $PL_{ne}$+additional value α" (=the target pressure $PL_t$).

Here, the "additional value α" is a difference between the target pressure $PL_t$ and the required line pressure $PL_{ne}$. The "additional value α" is set so that the lower the driver's driving force requirement is, the greater the additional value α is, and also the lower the required line pressure $PL_{ne}$ is, the greater the additional value α is. At this time, the required line pressure $PL_{ne}$ is set according to the driver's required driving force indicated by the accelerator opening, and the required line pressure $PL_{ne}$ is set so that the lower the required driving force is, the lower the required line pressure $PL_{ne}$ is. Therefore, by setting the "additional value α" so that the lower the required line pressure $PL_{ne}$ is, the greater the additional value α is, the target pressure $PL_t$ of the second pressure P2 when the accelerator opening is equal to or less than the target switching threshold value $APO_{th}$ (the accelerator opening≤the target switching threshold value $APO_{th}$) is set so that the smaller the driver's required driving force is, the greater the target pressure $PL_t$ is.

Here, a drive response to a command of the electric oil pump M/O/P driven by the sub motor S/M is higher than a drive response to a command of the mechanical oil pump O/P driven by the travel drive source (the engine Eng, the motor/generator MG). Therefore, the rotation speed of the electric oil pump M/O/P rises almost at the same time as an output of the command, whereas the rotation speed of the mechanical oil pump O/P rises with a time lag from an output of the command.

That is, by the fact that, at step S2, a start command is outputted to the travel drive source and the travel drive source (the engine Eng, the motor/generator MG) is started, the mechanical oil pump O/P is driven. On the other hand, by the fact that, at step S4 or step S5, a drive command is outputted to the sub motor S/M and the sub motor S/M is driven, the electric oil pump M/O/P is driven. At this time, the working fluid discharge amount of the electric oil pump M/O/P rises first, and after that, the working fluid discharge amount of the mechanical oil pump O/P rises.

At step S6, subsequent to the setting of the target pressure $PL_t$=the required line pressure $PL_{ne}$ at step S4, or subsequent to the setting of the target pressure $PL_t$=the required line pressure $PL_{ne}$+additional value α at step S5, the actual line pressure $PL_R$ is detected, and the routine proceeds to step S7.

Here, the actual line pressure $PL_R$ is detected by the line pressure sensor 28.

At step S7, subsequent to the detection of the actual line pressure $PL_R$ at step S6, a judgment is made as to whether or not the actual line pressure $PL_R$ detected at step S6 exceeds the target pressure regulation value by the line pressure regulating valve 104 which is set at step S4 or step S5. If YES (the actual line pressure $PL_R$>the target pressure regulation value), it is judged that a total flow amount (a flow amount of the working fluid flowing in the third oil passage 103) of the working fluid discharge flow amount from the mechanical oil pump O/P and the working fluid discharge flow amount from the electric oil pump M/O/P reaches a pressure regulation limit flow amount of the line pressure regulating valve 104, and the routine proceeds to step S8. If NO (the actual line pressure $PL_R$≤the target pressure regulation value), it is judged that the total flow amount does not reach the pressure regulation limit flow amount of the line pressure regulating valve 104, and the routine is returned to step S6. Then, the drive of the electric oil pump M/O/P and the mechanical oil pump O/P is continued.

At step S8, subsequent to the judgment of the actual line pressure $PL_R$>the target pressure regulation value at step S7, the actual line pressure $PL_R$ is detected again, and the routine proceeds to step S9.

At step S9, subsequent to the detection of the actual line pressure $PL_R$ at step S8, a judgment is made as to whether or not a value obtained by subtracting the required line pressure $PL_{ne}$ from this actual line pressure $PL_R$ detected at step S8 is equal to or greater than a predetermined pressure securing threshold value β. If YES (the actual line pressure $PL_R$–the required line pressure $PL_{ne}$≥the pressure securing threshold value β), it is judged that the actual line pressure $PL_R$ is sufficiently increased, and the routine proceeds to step S10. If NO (the actual line pressure $PL_R$–the required line pressure $PL_{ne}$<the pressure securing threshold value β), it is judged that the actual line pressure $PL_R$ is not sufficiently increased, and the routine is returned to step S8. Then, the drive of the electric oil pump M/O/P and the mechanical oil pump O/P is continued.

Here, the "pressure securing threshold value β" is a value by which it is possible to judge that the total flow amount (the flow amount of the working fluid flowing in the third oil passage 103) of the working fluid discharge flow amount from the mechanical oil pump O/P and the working fluid discharge flow amount from the electric oil pump M/O/P is sufficiently increased to the extent of covering a working fluid flow amount required to secure the required line pressure $PL_{ne}$. The pressure securing threshold value β is a arbitrarily set.

At step S10, subsequent to the judgment of the actual line pressure $PL_R$–the required line pressure $PL_{ne}$≥the pressure securing threshold value β at step S9, it is judged that the working fluid discharge flow amount of the mechanical oil pump O/P is sufficiently increased, then the working fluid discharge flow amount of the electric oil pump M/O/P is decreased, and the routine proceeds to step S11.

At this time, a decrease gradient (a decrease speed change) of the working fluid discharge flow amount is a predetermined value. To decrease the working fluid discharge flow amount, a target rotation speed of the electric oil pump M/O/P is decreased.

At step S11, after decreasing the working fluid discharge flow amount of the electric oil pump M/O/P at step S10, the actual line pressure $PL_R$ is detected again, and the routine proceeds to step S12.

At step S12, subsequent to the detection of the actual line pressure $PL_R$ at step S11, a judgment is made as to whether or not the actual line pressure $PL_R$ detected at step S11 is decreased or maintained. If YES (the actual line pressure $PL_R$ is decreased or maintained), it is judged that a decrease effect of the working fluid discharge flow amount of the electric oil pump M/O/P appears, and the routine proceeds to step S13. If NO (the actual line pressure $PL_R$ is increased), it is judged that the decrease effect of the working fluid discharge flow amount of the electric oil pump M/O/P does not appear, and the routine is returned to step S10. Then, the decrease of the working fluid discharge flow amount of the electric oil pump M/O/P is continued while keeping the decrease gradient.

At step S13, after judging that the actual line pressure $PL_R$ is decreased or maintained at step S12, in order that the actual line pressure $PL_R$ does not excessively decrease, the decrease gradient (the decrease speed change) of the working fluid discharge flow amount of the electric oil pumpM/O/P is changed to a gentle gradient, and the routine proceeds to step S14.

Here, the change of the decrease gradient to the gentle gradient is carried out by a predetermined value.

At step S14, subsequent to the change of the decrease gradient at step S13, the actual line pressure $PL_R$ is detected again, and the routine proceeds to step S15.

At step S15, subsequent to the detection of the actual line pressure $PL_R$ at step S14, a judgment is made as to whether or not the actual line pressure $PL_R$ detected at step S14 is maintained. If YES (the actual line pressure $PL_R$ is maintained), it is judged that a balance between an increase gradient of the working fluid discharge flow amount of the mechanical oil pump O/P and the decrease gradient of the working fluid discharge flow amount of the electric oil pump M/O/P is struck, and the routine proceeds to step S16. If NO (the actual line pressure $PL_R$ is decreased), it is judged that the decrease gradient of the working fluid discharge flow amount of the electric oil pump M/O/P is steeper than the increase gradient of the working fluid discharge flow amount of the mechanical oil pump O/P, and the routine is returned to step S13. Then, the decrease gradient (the decrease speed change) of the working fluid discharge flow amount of the electric oil pump M/O/P is changed to an even gentler gradient.

At step S16, after judging that the actual line pressure $PL_R$ is maintained at step S15, the decrease of the working fluid discharge flow amount of the electric oil pump M/O/P is continued while keeping the decrease gradient (the decrease speed change) of the working fluid discharge flow amount of the electric oil pump M/O/P, and the routine proceeds to step S17.

At step S17, subsequent to the continuation of the decrease of the working fluid discharge flow amount of the electric oil pump M/O/P at step S16, a judgment is made as to whether or not this working fluid discharge flow amount of the electric oil pump M/O/P becomes zero. If YES (the electric oil pump working fluid discharge flow amount=zero), it is judged that the second pressure P2 is zero, and the electric oil pump M/O/P is stopped by stopping the sub motor S/M, and the routine proceeds to END. If NO (the electric oil pump working fluid discharge flow amount≠zero), it is judged that the second pressure P2 is not zero, and the routine is returned to step S16. Then, the decrease of the working fluid discharge flow amount of the electric oil pump M/O/P is continued.

Next, operation or working of the vehicle oil pressure control device of the embodiment will be separately explained by [Electric oil pump stop operation at high accelerator opening vehicle start] and [Electric oil pump stop operation at low accelerator opening vehicle start].

[Electric Oil Pump Stop Operation at High Accelerator Opening Vehicle Start]

Figure 4:
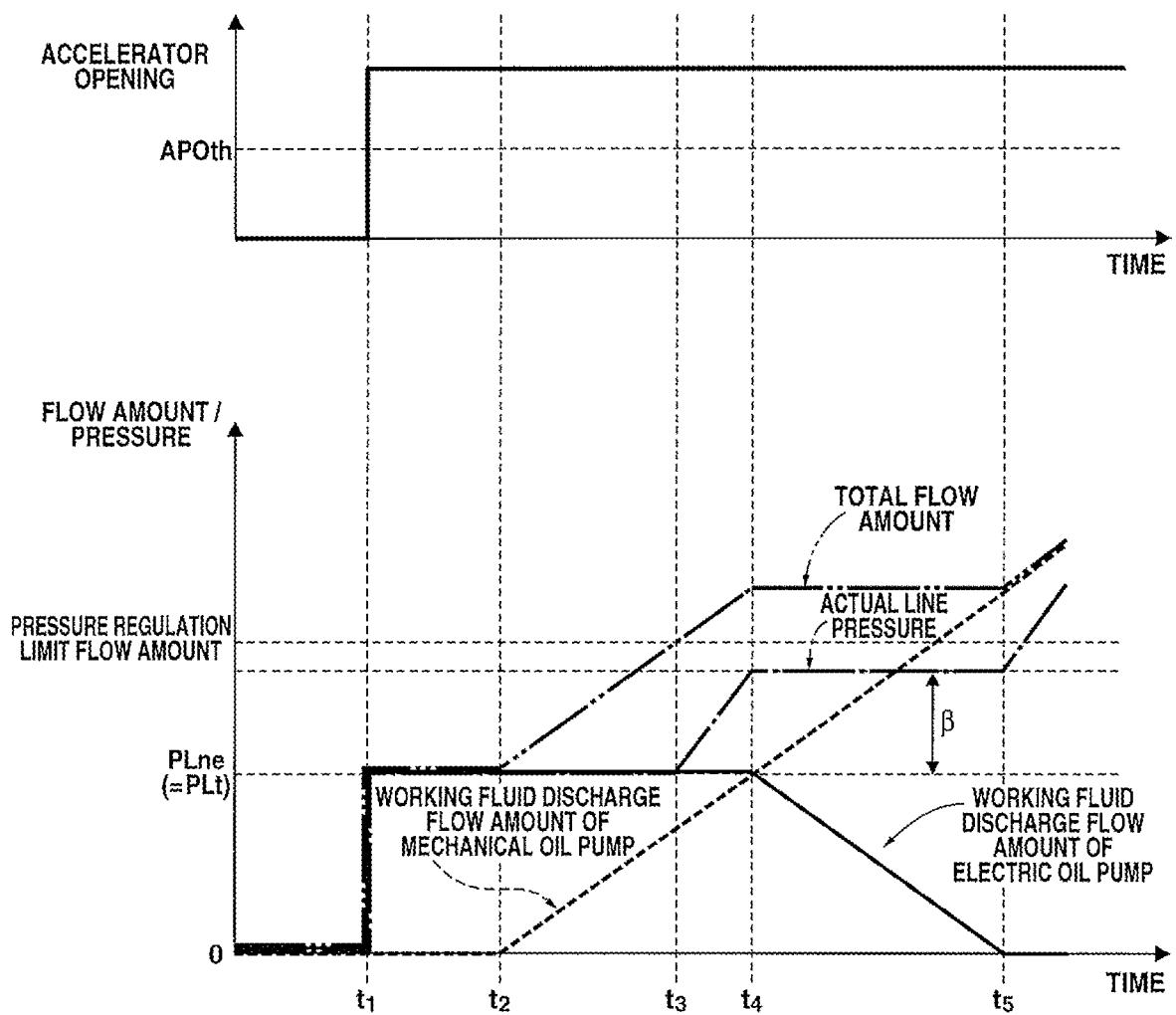
FIG. 4 is a time chart at a high accelerator opening vehicle start, showing characteristics of an accelerator opening, a working fluid discharge flow amount of the electric oil pump, a working fluid discharge flow amount of a mechanical oil pump, a total flow amount, an actual line pressure, of vehicle stop vehicle start→electric oil pump stop in the control device of the embodiment.

FIG. 4 is a time chart at a high accelerator opening vehicle start, showing characteristics of the accelerator opening, the working fluid discharge flow amount of the electric oil pump, the working fluid discharge flow amount of the mechanical oil pump, the total flow amount, the actual line pressure, of vehicle stop→vehicle start→electric oil pump stop in the control device of the embodiment. In the following description, the electric oil pump stop operation at high accelerator opening vehicle start will be explained with reference to FIG. 4.

Before time t1 shown in FIG. 4, the accelerator opening is zero, and no driving force requirement occurs. Thus, step S1 shown in FIG. 3 is repeated. Here, at this time, the idle-stop control is carried out, and the engine Eng and the motor/generator MG that are the travel drive source and the sub motor S/M are all stopped. Therefore, both of the mechanical oil pump O/P and the electric oil pump M/O/P stop, and the pressure supply from the oil pressure supply source OIL is completely stopped, then the working fluid in the hydraulic pressure control circuit 100 is drained by leaking.

At time t1, when the accelerator pedal is depressed, it is judged that the driving force requirement occurs, and the routine proceeds to step S2 (step S1→step S2), then the accelerator opening is detected, and the travel drive source (the engine Eng, the motor/generator MG) is started.

Here, since the accelerator opening at time t1 exceeds the target switching threshold value $APO_{th}$, the routine proceeds to step S4 (step S3→step S4), then the target pressure $PL_t$ of the second pressure P2 is set to the "required line pressure $PL_{ne}$", and the sub motor S/M is driven.

Further, the target pressure regulation value of the line pressure regulating valve 104 is set to the "required line pressure $PL_{ne}$".

With this operation, the working fluid is discharged from the electric oil pump M/O/P, and the working fluid discharge amount of the electric oil pump M/O/P becomes a value by which the second pressure P2 is maintained at the "required line pressure $PL_{ne}$".

Here, the drive response to the command of the electric oil pump M/O/P is higher than the drive response to the command of the mechanical oil pump O/P. Because of this, at time t1, only the electric oil pump M/O/P is driven, and only the working fluid discharged from the electric oil pump M/O/P flows into the third oil passage 103. Therefore, the total flow amount (the flow amount of the working fluid flowing in the third oil passage 103) of the working fluid discharge flow amount from the mechanical oil pump O/P and the working fluid discharge flow amount from the electric oil pump M/O/P is identical to the working fluid discharge flow amount from the electric oil pump M/O/P.

Further, the hydraulic pressure (the third pressure P3) of the third oil passage 103 where the working fluid of this total flow amount flows is regulated by the line pressure regulating valve 104, then the actual line pressure $PL_R$ becomes the "required line pressure $PL_{ne}$".

At time t2, when the discharge of the working fluid from the mechanical oil pump O/P starts, the working fluid discharge amount of the mechanical oil pump O/P starts to increase. With this increase, the total flow amount also starts to increase.

However, because the working fluid discharge flow amount of the mechanical oil pump O/P immediately after the working fluid discharge amount of the mechanical oil pump O/P starts to increase is small, the total flow amount immediately after the working fluid discharge amount of the mechanical oil pump O/P starts to increase is less than the pressure regulation limit flow amount of the line pressure regulating valve 104. Therefore, a proper pressure regulation by the line pressure regulating valve 104 can be possible. Then, a surplus pressure with respect to the target pressure regulation value from the total flow amount supplied to the line pressure regulating valve 104 escapes (is supplied) to the drain circuit, and the actual line pressure $PL_R$ is maintained at the "required line pressure $PL_{ne}$". On the other hand, the working fluid discharge flow amount of the electric oil pump M/O/P continues to be set to the value that maintains the "required line pressure $PL_{ne}$" regardless of the increasing working fluid discharge flow amount of the mechanical oil pump O/P.

At time t3, when the total flow amount reaches the pressure regulation limit flow amount of the line pressure regulating valve 104 by increase of the working fluid discharge flow amount of the mechanical oil pump O/P, the working fluid amount supplied to this line pressure regulating valve 104 is excessive, then the proper pressure regulation by the line pressure regulating valve 104 cannot be possible. That is, the escaping amount (the draining amount) required to regulate the actual line pressure $PL_R$ to the target pressure regulation value exceeds the upper limit of the escaping amount (the draining amount) of the line pressure regulating valve 104, and the working fluid flow amount flowing to the line pressure oil passage 105 increases. As a consequence, the actual line pressure $PL_R$ becomes the "required line pressure $PL_{ne}$" (=the target pressure regulation value) or greater. With this, the routine proceeds to step S8 (step S6→step S7→step S8).

At this time, the rotation of the travel drive source (the engine Eng, the motor/generator MG) continues increasing, and by this rotation increase, the working fluid discharge flow amount of the mechanical oil pump O/P is increased. Therefore, the total flow amount is also increased, and the actual line pressure $PL_R$ continues increasing.

Then, at time t4, when a value obtained by subtracting the required line pressure $PL_{ne}$ from the increasing actual line pressure $PL_R$, i.e. a difference between the actual line pressure $PL_R$ and the required line pressure $PL_{ne}$, reaches the pressure securing threshold value β, it is judged that the total flow amount is sufficiently increased to the extent of securing the required line pressure $PL_{ne}$, and the routine proceeds to step S10 (step S9→step S10). Then, the decrease of the working fluid discharge flow amount of the electric oil pump M/O/P is started.

When starting to decrease the working fluid discharge flow amount of the electric oil pump M/O/P after proceeding to step S10, the working fluid discharge flow amount of the electric oil pump M/O/P is decreased at the predetermined decrease gradient. Then, the routine proceeds to step S12 (step S11→step S12), and the judgment is made as to whether or not, as a result of decreasing the working fluid discharge flow amount of the electric oil pump M/O/P, the actual line pressure $PL_R$ is decreased or maintained.

Here, if a decrease amount of the working fluid discharge flow amount of the electric oil pump M/O/P is less than an increase amount of the working fluid discharge flow amount of the mechanical oil pump O/P, the actual line pressure $PL_R$ continues increasing. On the other hand, if the decrease amount of the working fluid discharge flow amount of the electric oil pump M/O/P is greater than the increase amount of the working fluid discharge flow amount of the mechanical oil pump O/P, the actual line pressure $PL_R$ is decreased. Further, if the decrease amount of the working fluid discharge flow amount of the electric oil pump M/O/P is equal to the increase amount of the working fluid discharge flow amount of the mechanical oil pump O/P, the actual line pressure $PL_R$ is maintained.

When the actual line pressure $PL_R$ is decreased or maintained, the routine proceeds to step S13, and the decrease gradient is changed to the gentle gradient, and the routine proceeds to step S15 (step S14→step S15), then the judgment is made as to whether or not, as a result of changing the decrease gradient to the gentle gradient, the actual line pressure $PL_R$ is maintained.

Here, if the decrease gradient is steep (the decrease speed change of the working fluid discharge flow amount is fast), the decrease amount of the working fluid discharge flow amount of the electric oil pump M/O/P is greater than the increase amount of the working fluid discharge flow amount of the mechanical oil pump O/P, and the actual line pressure $PL_R$ continues decreasing. Therefore, the decrease gradient of the working fluid discharge flow amount of the electric oil pump M/O/P is controlled so as to equalize the decrease amount of the working fluid discharge flow amount of the electric oil pump M/O/P with the increase amount of the working fluid discharge flow amount of the mechanical oil pump O/P.

Then, when the actual line pressure $PL_R$ is maintained, the routine proceeds to step S16, and the decrease of the working fluid discharge flow amount of the electric oil pump M/O/P is continued while keeping the decrease gradient. That is, the working fluid discharge flow amount of the electric oil pump M/O/P is decreased while maintaining the actual line pressure $PL_R$ at a value of a time when the working fluid discharge flow amount of the electric oil pump M/O/P starts to decrease.

With this, the actual line pressure $PL_R$ can be maintained at a value at least the pressure securing threshold value β higher than the required line pressure $PL_{ne}$. Then, even if the required driving force is increased and the required line pressure $PL_{ne}$ is increased after the start of the decrease of the working fluid discharge flow amount of the electric oil pump M/O/P, it is possible to prevent the actual line pressure $PL_R$ from falling below the required line pressure $PL_{ne}$. Especially immediately after the vehicle start, a further acceleration requirement (an additional depression of the accelerator pedal) tends to occur. However, by maintaining the actual line pressure $PL_R$ at the higher value than the required line pressure $PL_{ne}$, a retaining force of the transmission control and the continuously variable transmission CVT can be increased for the further increase of the required driving force.

At time t5, when the working fluid discharge flow amount of the electric oil pump M/O/P becomes zero, YES is judged at step S17, and the sub motor S/M is stopped and the pressure supply from this electric oil pump M/O/P is completely stopped.

In this manner, in the control device of the embodiment, when the total flow amount of the working fluid discharge flow amount of the mechanical oil pump O/P and the working fluid discharge flow amount of the electric oil pump M/O/P is equal to or greater than the pressure regulation limit flow amount of the line pressure regulating valve 104, the working fluid discharge flow amount of the electric oil pump M/O/P is decreased.

Here, a state in which the total flow amount is equal to or greater than the pressure regulation limit flow amount is a state in which the working fluid amount supplied to the line pressure regulating valve 104 is excessive for a regulatable fluid amount by the line pressure regulatingvalve 104. That is, thismeans that theworking fluid discharge flow amount of the mechanical oil pump O/P is sufficiently increased. With this, even though the working fluid discharge flow amount of the electric oil pump M/O/P is decreased at time t4, the working fluid amount required to secure the required line pressure $PL_{ne}$ is covered or secured.

Further, when decreasing the working fluid discharge flow amount of the electric oil pump M/O/P at this timing, the decrease of the working fluid discharge flow amount of the electric oil pump M/O/P can be started before the required line pressure $PL_{ne}$ can be secured by only the working fluid discharge flow amount of the mechanical oil pump O/P.

As a consequence, the required line pressure $PL_{ne}$ can be secured while avoiding oil vibration (hydraulic vibration) by which the line pressure PL fluctuates, and also an unnecessary drive of the electric oil pump M/O/P can be suppressed, thereby suppressing power consumption amount of the sub motor S/M that drives the electric oil pump M/O/P.

Furthermore, when the driver's driving force requirement is large (the accelerator opening>the target switching threshold value $APO_{th}$), the increase gradient when the working fluid discharge flow amount of the mechanical oil pump O/P is increased is relatively steep. Because of this, there may arise a pulsation of the working fluid discharge flow amount of the mechanical oil pump O/P. When the working fluid discharge flow amount of the mechanical oil pump O/P pulsates, the total flow amount of the working fluid discharge flow amount of the mechanical oil pump O/P and the working fluid discharge flow amount of the electric oil pump M/O/P also pulsates and might exceed and fall below the pressure regulation limit flow amount. Then, when the total flow amount exceeds the pressure regulation limit flow amount, the working fluid discharge flow amount of the electric oil pump M/O/P is decreased. And, when the total flow amount falls below the pressure regulation limit flow amount, the working fluid discharge flow amount of the electric oil pump M/O/P is increased.

As mentioned above, the decrease and increase of the working fluid discharge flow amount of the electric oil pump M/O/P is repeated according to the pulsation of the working fluid discharge flow amount of the mechanical oil pump O/P, and the working fluid discharge flow amount of the electric oil pump M/O/P becomes unstable. In addition, when the working fluid discharge flow amount of the electric oil pump M/O/P becomes unstable, the actual line pressure $PL_R$ also fluctuates and the so-called oil vibration (hydraulic vibration) occurs, then there is a risk that the driver will be subjected to an odd or awkward feeling by the fact that the transmission ratio is changed.

For this problem, in the embodiment, in a case where the driver's required driving force is high, i.e. when the accelerator opening is greater than the target switching threshold value $APO_{th}$, the target pressure $PL_t$ of the second pressure P2 is set to a relatively low value. The target pressure $PL_t$ of the second pressure P2 here is set to the required line pressure $PL_{ne}$.

Therefore, the working fluid discharge flow amount of the electric oil pump M/O/P becomes small, it is thus possible to secure a large difference between the total flow amount before the mechanical oil pump O/P is driven and the pressure regulation limit flow amount.

With this, the working fluid discharge flow amount of the mechanical oil pump O/P will have been increased by the time the total flow amount exceeds the pressure regulation limit flow amount, and the pulsation of the mechanical oil pump O/P is suppressed, it is therefore possible to prevent the total flow amount from exceeding and falling below the pressure regulation limit flow amount. The fluctuation of the actual line pressure $PL_R$ is suppressed, then the odd or awkward feeling which is the driver is subjected to, which is caused by the fact that the transmission ratio is changed, can be reduced.

Especially in the present embodiment, until the difference between the actual line pressure $PL_R$ and the required line pressure $PL_{ne}$ is equal to or greater than the pressure securing threshold value β after the total flow amount exceeds the pressure regulation limit flow amount, i.e. after the actual line pressure $PL_R$ exceeds the target pressure regulation value of the line pressure regulating valve 104, the working fluid discharge flow amount of the electric oil pump M/O/P is not decreased.

That is, in a case where the driver's required driving force is high, the target pressure $PL_t$ of the second pressure P2 is set to the "required line pressure $PL_{ne}$", and the working fluid discharge flow amount of the electric oil pump M/O/P when the control is started is suppressed, then a large difference between the total flow amount and the pressure regulation limit flow amount is secured. Further, when the difference between the actual line pressure $PL_R$ and the required line pressure $PL_{ne}$ is equal to or greater than the pressure securing threshold value β after the total flow amount exceeds the pressure regulation limit flow amount, the decrease of the working fluid discharge flow amount of the electric oil pump M/O/P is started.

With this operation, the total flow amount at a time point when the decrease of the working fluid discharge flow amount of the electric oil pump M/O/P is started greatly exceeds the pressure regulation limit flow amount. Hence, even if the pulsation occurs in the working fluid discharge flow amount of the mechanical oil pump O/P, the total flow amount can be prevented from falling below the pressure regulation limit flow amount, then it is possible to stably decrease the working fluid discharge flow amount of the electric oil pump M/O/P. Accordingly, the fluctuation of the actual line pressure $PL_R$ is suppressed, then the odd or awkward feeling which is the driver is subjected to, which is caused by the fact that the transmission ratio is changed, can be reduced.

Further, in the present embodiment, a judgment of a state in which the total flow amount of the working fluid discharge flow amount of the mechanical oil pump O/P and the working fluid discharge flow amount of the electric oil pump M/O/P reaches the pressure regulation limit flow amount of the line pressure regulating valve 104 is made by the increase, which is more than the target pressure regulation value, of the actual line pressure $PL_R$ that is an actually regulated pressure value (an actual regulation pressure value) by this line pressure regulating valve 104.

Therefore, the state of the total flow amount can be readily obtained, thereby easily improving accuracy of the stop control of the electric oil pump M/O/P.

[Electric Oil Pump Stop Operation at Low Accelerator Opening Vehicle Start]

Figure 5:
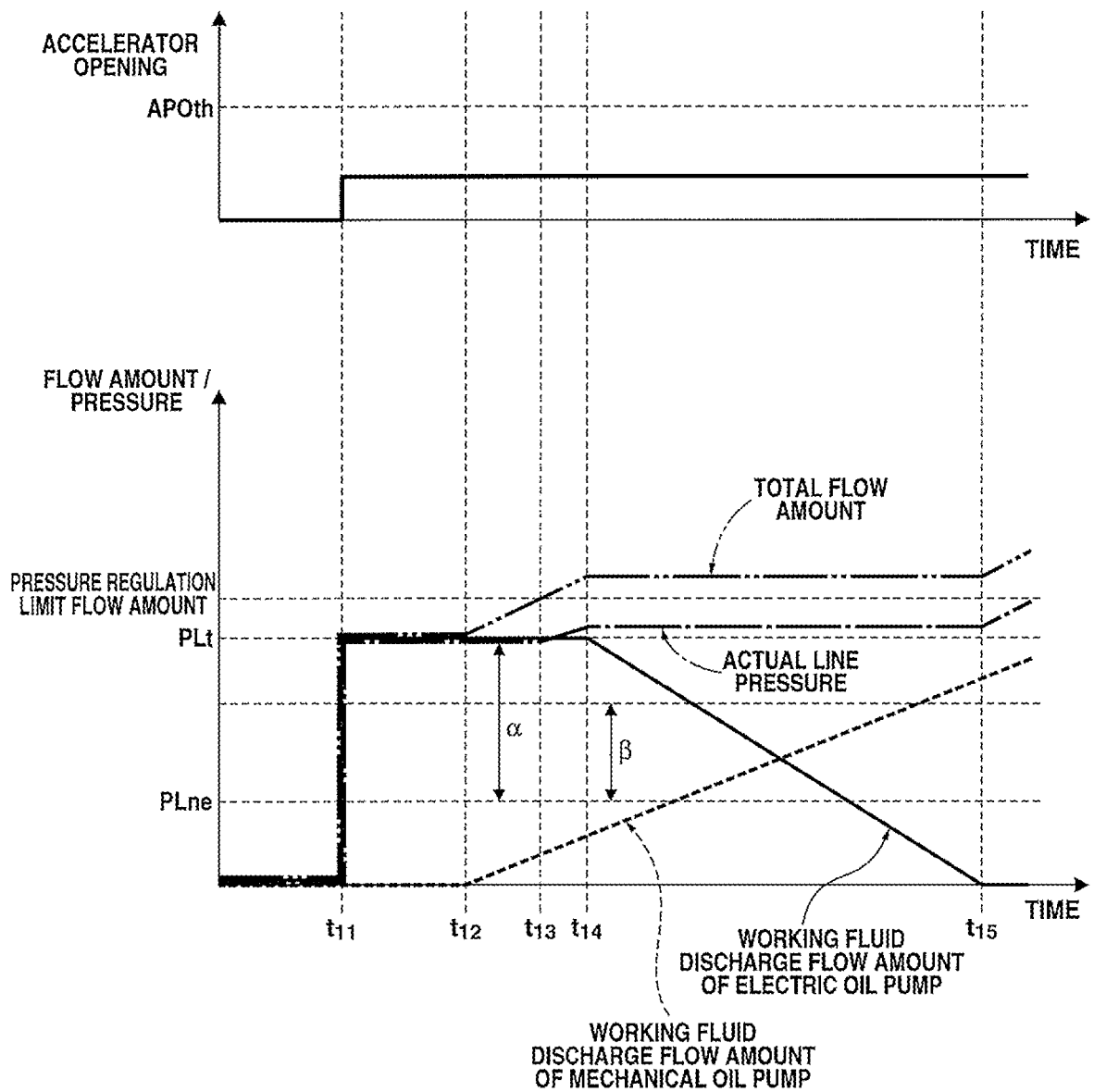
FIG. 5 is a time chart at a low accelerator opening vehicle start, showing characteristics of an accelerator opening, a working fluid discharge flow amount of the electric oil pump, a working fluid discharge flow amount of a mechanical oil pump, a total flow amount, an actual line pressure, of vehicle stop→vehicle start→electric oil pump stop in the control device of the embodiment.

FIG. 5 is a time chart at a low accelerator opening vehicle start, showing characteristics of the accelerator opening, the working fluid discharge flow amount of the electric oil pump, the working fluid discharge flow amount of the mechanical oil pump, the total flow amount, the actual line pressure, of vehicle stop→vehicle start→electric oil pump stop in the control device of the embodiment. In the following description, the electric oil pump stop operation at low accelerator opening vehicle start will be explained with reference to FIG. 5.

Before time t11 shown in FIG. 5, the accelerator opening is zero, and no driving force requirement occurs. Thus, step S1 shown in FIG. 3 is repeated. Here, at this time, the idle-stop control is carried out, and the engine Eng and the motor/generator MG that are the travel drive source and the sub motor S/M are all stopped. Therefore, both of the mechanical oil pump O/P and the electric oil pump M/O/P stop, and the pressure supply from the oil pressure supply source OIL is completely stopped, then the working fluid in the hydraulic pressure control circuit 100 is drained by leaking.

At time t11, when the accelerator pedal is depressed, it is judged that the driving force requirement occurs, and the routine proceeds to step S2 (step S1→step S2), then the accelerator opening is detected, and the travel drive source (the engine Eng, the motor/generator MG) is started.

Here, since the accelerator opening at time t11 is less than the target switching threshold value $APO_{th}$, the routine proceeds to step S5 (step S3→step S5), then the target pressure $PL_t$ of the second pressure P2 is set to the "required line pressure $PL_{ne}$+additional value α", and the sub motor S/M is driven.

Further, the target pressure regulation value of the line pressure regulating valve 104 is set to the "required line pressure $PL_{ne}$+additional value α".

With this operation, the working fluid is discharged from the electric oil pump M/O/P, and the working fluid discharge amount of the electric oil pump M/O/P becomes a value by which the second pressure P2 is maintained at the "required line pressure $PL_{ne}$+additional value α".

Here, the drive response to the command of the electric oil pump M/O/P is higher than the drive response to the command of the mechanical oil pump O/P. Because of this, at time t11, only the electric oil pump M/O/P is driven, and only the working fluid discharged from the electric oil pump M/O/P flows into the third oil passage 103. Therefore, the total flow amount (the flow amount of the working fluid flowing in the third oil passage 103) of the working fluid discharge flow amount from the mechanical oil pump O/P and the working fluid discharge flow amount from the electric oil pump M/O/P is identical to the working fluid discharge flow amount from the electric oil pump M/O/P.

Further, the hydraulic pressure (the third pressure P3) of the third oil passage 103 where the working fluid of this total flow amount flows is regulated by the line pressure regulating valve 104, then the actual line pressure $PL_R$ becomes the "required line pressure $PL_{ne}$+additional value α".

At time t12, when the discharge of the working fluid from the mechanical oil pump O/P starts, the working fluid discharge amount of the mechanical oil pump O/P starts to increase. With this increase, the total flow amount also starts to increase.

However, because the working fluid discharge flow amount of the mechanical oil pump O/P immediately after the working fluid discharge amount of the mechanical oil pump O/P starts to increase is small, the total flow amount immediately after the working fluid discharge amount of the mechanical oil pump O/P starts to increase is less than the pressure regulation limit flow amount of the line pressure regulating valve 104. Therefore, a proper pressure regulation by the line pressure regulating valve 104 can be possible. Then, a surplus pressure with respect to the target pressure regulation value from the total flow amount supplied to the line pressure regulating valve 104 escapes (is supplied) to the drain circuit, and the actual line pressure $PL_R$ is maintained at the "required line pressure $PL_{ne}$+additional value α". On the other hand, the working fluid discharge flow amount of the electric oil pump M/O/P continues to be set to the value that maintains the "required line pressure $PL_{ne}$+additional value α" regardless of the working fluid discharge flow amount of the mechanical oil pump O/P.

At time t13, the total flow amount reaches the pressure regulation limit flow amount of the line pressure regulating valve 104 by increase of the working fluid discharge flow amount of the mechanical oil pump O/P.

Here, at the low accelerator opening vehicle start shown in FIG. 5, the accelerator opening is relatively low, and the driver's required driving force at the vehicle start is low. Because of this, an increase speed of the driving torque of the travel drive source (the engine Eng, the motor/generator MG) after starting the travel drive source (the engine Eng, the motor/generator MG) is relatively slow (low), and the increase gradient of the working fluid discharge flow amount of the mechanical oil pump O/P is gentler than that at the high accelerator opening vehicle start shown in FIG. 4.

However, in the present embodiment, at the low accelerator opening vehicle start, the target pressure $PL_t$ of the second pressure P2 is set to the "required line pressure $PL_{ne}$+additional value α", and the working fluid discharge amount of the electric oil pump M/O/P is set to a value by which the second pressure P2 is maintained at this "required line pressure $PL_{ne}$+additional value α".

Therefore, the difference between the total flow amount at the control start (at time t11) and the pressure regulation limit flow amount of the of the line pressure regulating valve 104 can be kept small. With this setting, even if the increase gradient of the working fluid discharge flow amount of the mechanical oil pump O/P is gentle, a time required for the total flow amount to reach the pressure regulation limit flow amount can be prevented from being redundant, then an increase of a drive time of the electric oil pump M/O/P can be avoided.

Further, since the total flow amount reaches the pressure regulation limit flow amount of the line pressure regulating valve 104 at time t13, the working fluid amount supplied to this line pressure regulating valve 104 is excessive, then the proper pressure regulation by the line pressure regulating valve 104 cannot be possible. As a consequence, the actual line pressure $PL_R$ becomes the "required line pressure $PL_{ne}$+ additional value α" (=the target pressure regulation value) or greater. With this, the routine proceeds to step S8 (step S6→step S7→step S8).

At this time, the actual line pressure $PL_R$ is the "required line pressure $PL_{ne}$+additional value α" or greater, and a value obtained by subtracting the required line pressure $PL_{ne}$ from the actual line pressure $PL_R$, i.e. a difference between the actual line pressure $PL_R$ and the required line pressure $PL_{ne}$, is greater than the pressure securing threshold value β.

Because of this, the decrease of the working fluid discharge flow amount of the electric oil pump M/O/P is immediately started from time t14.

Since an operation of the decrease of the working fluid discharge flow amount of the electric oil pump M/O/P after time t14 is the same as that at the above high accelerator opening vehicle start, a detailed explanation is omitted. That is, the decrease gradient of the working fluid discharge flow amount of the electric oil pump M/O/P is controlled, and the working fluid discharge flow amount of the electric oil pump M/O/P is decreased while maintaining the actual line pressure $PL_R$ at a value of a time when the working fluid discharge flow amount of the electric oil pump M/O/P starts to decrease.

Then, at time t15, when the working fluid discharge flow amount of the electric oil pump M/O/P becomes zero, YES is judged at step S17, and the sub motor S/M is stopped and the pressure supply from this electric oil pump M/O/P is completely stopped.

In this manner, in the control device of the embodiment, the target pressure $PL_t$ of the second pressure P2 that is the discharge pressure of the electric oil pump M/O/P is set to a value that is equal to or greater than the required line pressure $PL_{ne}$. With this setting, a time required for the total flow amount to reach the pressure regulation limit flow amount and for the actual line pressure $PL_R$ to exceed the target pressure $PL_t$ from a timing when the working fluid discharge flow amount of the mechanical oil pump O/P starts to increase by and according to the start of the travel drive source (the engine Eng, the motor/generator MG) can be prevented from being redundant. Hence, the drive time of the electric oil pump M/O/P is further shortened, and power consumption amount to drive the sub motor S/M can be suppressed.

Especially in the present embodiment, when the accelerator opening is equal to or less than the target switching threshold value $APO_{th}$, i.e. when the driver's required driving force is equal to or less than a predetermined threshold value, the target pressure $PL_t$ (the target pressure regulation value) of the second pressure P2 is set to the value (the "required line pressure $PL_{ne}$+additional value α") that is greater than the required line pressure $PL_{ne}$.

Therefore, even in a case where the required driving force is low and the increase gradient of the working fluid discharge flow amount of the mechanical oil pump O/P is gentle, the working fluid discharge amount of the electric oil pump M/O/P can be kept large. Consequently, it is possible to suppress an increase of a time required to judge that the total flow amount reaches the pressure regulation limit flow amount and the actual line pressure $PL_R$ exceeds the target pressure $PL_t$, then the drive time of the electric oil pump M/O/P can be shortened.

Further, in the present embodiment, the "additional value α" that is the difference between the target pressure $PL_t$ and the required line pressure $PL_{ne}$ is set so that the lower the required line pressure $PL_{ne}$ is, the greater the additional value α is. And, the target pressure $PL_t$ of the second pressure P2 is set so that the smaller the driver's required driving force is, the higher the target pressure $PL_t$ is.

Here, the lower the driver's required driving force is, the slower the increase speed of the drive source torque from the travel drive source (the engine Eng, the motor/generator MG) is, and the increase gradient of the working fluid discharge flow amount of the mechanical oil pump O/P becomes gentle.

Therefore, by setting the target pressure $PL_t$ of the second pressure P2 so that the smaller the driver's required driving force is, the higher the target pressure $PL_t$ is, the working fluid discharge amount of the electric oil pump M/O/P can be previously large. Then, even if the increase gradient of the working fluid discharge flow amount of the mechanical oil pump O/P is gentle, the actual line pressure $PL_R$ at the control start can be kept at a higher value than the required line pressure $PL_{ne}$. As a consequence, the time required for the total flow amount to reach the pressure regulation limit flow amount and for the actual line pressure $PL_R$ to exceed the target pressure $PL_t$ can be shortened. The drive time of the electric oil pump M/O/P can therefore be shortened.

Next, effects will be explained. The vehicle oil pressure control device of the embodiment can obtain the following effects.

(1) An oil pressure control device for a vehicle has: a first oil pump (a mechanical oil pump O/P) driven by a travel drive source (a motor/generator MG) and discharging working fluid; a second oil pump (an electric oil pump M/O/P) driven by an electric motor (a sub motor S/M) that is provided separately from the travel drive source (the motor/generator MG) and discharging working fluid; a pressure regulating valve (a line pressure regulating valve 104) regulating a first oil pump discharge pressure (a first pressure P1) and/or a second oil pump discharge pressure (a second pressure P2); and an oil pressure controller (an integrated controller 10) configured to change, during pressure regulation by the pressure regulating valve (the line pressure regulating valve 104), a state from a state in which the travel drive source (motor/generator MG) is stopped and the second oil pump (an electric oil pump M/O/P) is driven to a state in which the travel drive source (motor/generator MG) is started and the second oil pump (an electric oil pump M/O/P) is stopped. And, the oil pressure controller (the integrated controller 10) is configured to, when a total flow amount of a working fluid discharge flow amount of the first oil pump (a mechanical oil pump O/P) and a working fluid discharge flow amount of the second oil pump (an electric oil pump M/O/P) is equal to or greater than a pressure regulation limit flow amount of the pressure regulating valve (the line pressure regulating valve 104), decrease the working fluid discharge flow amount of the second oil pump (an electric oil pump M/O/P).

With this configuration, when stopping the second oil pump (an electric oil pump M/O/P), power consumption amount of the electric motor (the sub motor S/M) that drives the second oil pump (an electric oil pump M/O/P) can be suppressed while securing the required line pressure $PL_{ne}$.

(2) The oil pressure controller (the integrated controller 10) is configured so that a judgment of a state in which the total flow amount reaches the pressure regulation limit flow amount is made by an increase, which is more than a target pressure regulation value, of an actual regulation pressure value (an actual line pressure $PL_R$) by the pressure regulating valve (the line pressure regulating valve 104).

With this configuration, in addition to an effect of (1), the state of the total flow amount can be readily obtained, thereby easily improving accuracy of the stop control of the electric oil pump M/O/P.

(3) The oil pressure controller (the integrated controller 10) is configured to, before decreasing the working fluid discharge flow amount of the second oil pump (the electric oil pump M/O/P), set a target pressure (a target pressure $PL_t$) of the second oil pump discharge pressure (the second pressure P2) to a value that is equal to or greater than the required line pressure $PL_{ne}$.

With this configuration, in addition to the effect of (1) or (2), the second pressure P2 at the start of the travel drive source (the motor/generator MG) can be set to the value that is equal to or greater than the required line pressure $PL_{ne}$, a time required for the total flow amount to reach the pressure regulation limit flow amount from an occurrence of the working fluid discharge flow amount of the mechanical oil pump O/P is shortened, thereby preventing the drive time of the electric oil pump M/O/P from being redundant.

(4) The oil pressure controller (the integrated controller 10) is configured to set the target pressure of the second oil pump discharge pressure so that the smaller the driver's required driving force is, the greater the target pressure $PL_t$ is.

With this configuration, in addition to the effect of (3), even if the driver's required driving force is small and the increase gradient of the working fluid discharge flow amount of the mechanical oil pump O/P is gentle, an increase of a time required for the total flow amount to reach the pressure regulation limit flow amount can be suppressed, and the drive time of the electric oil pump M/O/P can be prevented from being redundant. Further, even if the driver's required driving force is large and the working fluid discharge flow amount of the mechanical oil pump O/P pulsates, repeat of the decrease and increase of the working fluid discharge flow amount of the electric oil pump M/O/P can be prevented, thereby reducing the odd or awkward feeling which is the driver is subjected to.

(5) The oil pressure controller (the integrated controller 10) is configured to, at all times during the decrease of the working fluid discharge flow amount of the second oil pump (the electric oil pump M/O/P), maintain an actual regulation pressure value (an actual line pressure $PL_R$) by the pressure regulating valve (the line pressure regulating valve 104) at a time when the decrease of the working fluid discharge flow amount of the second oil pump (the electric oil pump M/O/P) is started.

With this configuration, in addition to the effects of (1) to (4), even if a further acceleration requirement occurs during the decrease of the working fluid discharge flow amount of the electric oil pump M/O/P, it is possible to prevent the actual line pressure $PL_R$ from falling below the required line pressure $PL_{ne}$.

Although the vehicle oil pressure control device of the present invention has been explained on the basis of the embodiment, a specified configuration is not limited to the embodiment. The configuration includes all design modifications and equivalents belonging to the technical scope of the present invention.

In the above embodiment, as an example, when decreasing the working fluid discharge flow amount of the electric oil pump M/O/P, the working fluid discharge flow amount of the electric oil pump M/O/P is gradually decreased with time. However, the present invention is not limited to this. For instance, when a predetermined decrease condition (the total flow amount reaches the pressure regulation limit flow amount of the line pressure regulating valve 104) is satisfied, the discharge of the working fluid from the electric oil pump M/O/P might be stopped by stopping the sub motor S/M at this timing.

The embodiment shows an example in which the mechanical oil pump O/P is connected to the motor output shaft MGout of the motor/generator MG through the chain CH, and the mechanical oil pump O/P is driven basically by the motor/generator MG. However, the present invention is not limited to this. As the mechanical oil pump O/P, even if the engine Eng and the motor/generator MG are provided as the travel drive source, the mechanical oil pump O/P could be connected to the output shaft of the engine Eng, and could be driven by the engine Eng.

In this case, as a scene in which the travel drive source is started, it is a scene in which the engine Eng is started in order to obtain an engine torque from an engine stop state for an EV travel with an ignition switch being ON, or a scene in which the engine Eng is stopped once for the EV travel or a coast travel regenerative braking from an engine Eng operating state, and subsequently the engine Eng is restarted.

Further, as shown in the present embodiment, there is a case where, even though the mechanical oil pump O/P is connected to the motor/generator MG, this motor/generator MG is stopped, and only the engine Eng is driven. At this time, the mechanical oil pump O/P is substantially driven by the engine Eng. The motor/generator MG at this time does not output the motor torque, and is dragged (or rotated) by the rotation of the engine Eng.

In the above embodiment, as an example, the actual line pressure $PL_R$ is maintained at the value of the time when the working fluid discharge flow amount of the electric oil pump M/O/P starts to decrease until the working fluid discharge flow amount of the electric oil pump M/O/P becomes zero. However, the present invention is not limited to this. For instance, when a predetermined condition is satisfied, a state in which the actual line pressure $PL_R$ is maintained is cancelled, then the actual line pressure $PL_R$ could be decreased to the required line pressure $PL_{ne}$. With this operation, a time period for which the actual line pressure $PL_R$ is higher than the required line pressure $PL_{ne}$ can be shortened, thereby suppressing the power consumption amount of the sub motor S/M.

Here, the predetermined condition is that an elapsed time from an occurrence of the driving force requirement is a predetermined time or more, or that the vehicle speed is a predetermined speed or more. In this case, the predetermined time or the predetermined speed is set to a value that can predict that no further driving force requirement from the driver occurs. This value is previously determined by experiment.

The embodiment shows an example in which the vehicle oil pressure control device of the present invention is applied to the hybrid vehicle having the engine Eng and the motor/generator MG. However, the present invention is not limited to this. The vehicle oil pressure control device of the present invention can be applied to an electric vehicle mounting only the motor/generator MG as the travel drive source, an engine vehicle mounting only the engine Eng as the travel drive source, a plug-in hybrid vehicle and a fuel cell powered vehicle.

The invention claimed is:

1. An oil pressure control device for a vehicle comprising:
   a first oil pump configured to be driven by a travel drive source and to discharge working fluid;
   a second oil pump configured to be driven by an electric motor that is provided separately from the travel drive source and to discharge working fluid;
   a pressure regulating valve configured to regulate a first oil pump discharge pressure and/or a second oil pump discharge pressure, said pressure regulation valve having a pressure regulation limit, wherein a total flow above the pressure regulation limit causes a rise in working fluid pressure; and
   an oil pressure controller configured to change, during pressure regulation by the pressure regulating valve, a state from a state in which the travel drive source is stopped and the second oil pump is driven to a state in which the travel drive source is started and the second oil pump is stopped,
   the oil pressure controller being configured to decrease the flow of working fluid discharged from the second oil pump in accordance with a decrease gradient having a predetermined value in response to determining that the total flow of (i) working fluid discharged from the first oil pump and (ii) working fluid discharged from the second oil pump is equal to or greater than the pressure regulation limit of the pressure regulating valve, wherein the oil pressure controller is configured to decrease the flow of working fluid discharged from the second oil pump by decreasing a rotation speed of the second oil pump based on the working fluid pressure,
   wherein the oil pressure controller is configured such that the determination that the total flow of (i) working fluid discharged from the first oil pump and (ii) working fluid discharged from the second oil pump is equal to or greater than the pressure regulation limit of the pressure regulating valve is based on the rise in working fluid pressure caused by the pressure regulation limit of the pressure regulation valve.

2. The oil pressure control device for the vehicle as claimed in claim 1, wherein:

the oil pressure controller is configured to, before decreasing the working fluid discharged from the second oil pump, set a target pressure of the second oil pump discharge pressure to a value that is equal to or greater than a required line pressure.

3. The oil pressure control device for the vehicle as claimed in claim 2, wherein:
the oil pressure controller is configured to set the target pressure of the second oil pump discharge pressure such that the smaller a driver's required driving force is, the greater the target pressure is.

4. The oil pressure control device for the vehicle as claimed in claim 1, wherein:
the oil pressure controller is configured to, at all times during the decrease of the working fluid discharged from the second oil pump, maintain an actual regulation pressure value by the pressure regulating valve at a time when the decrease of the working fluid discharged from the second oil pump is started.

5. A method of controlling working fluid pressure for a vehicle, the vehicle having a first oil pump driven by a travel drive source and discharging working fluid, a second oil pump driven by an electric motor provided separately from the travel drive source and discharging working fluid, and a pressure regulating valve regulating a first oil pump discharge pressure and/or a second oil pump discharge pressure, said pressure regulation valve having a pressure regulation limit, wherein a total flow above the pressure regulation limit causes a rise in the working fluid pressure, the method comprising:
changing from a state in which the travel drive source is stopped and the second oil pump is driven to a state in which the travel drive source is started and the second oil pump is stopped; and
decreasing the flow of working fluid discharged from the second oil pump in accordance with a decrease gradient having a predetermined value in response to determining that the total flow of (i) working fluid discharged from the first oil pump and (ii) working fluid discharged from the second oil pump is equal to or greater than the pressure regulation limit of the pressure regulating valve, wherein decreasing the flow of working fluid discharged from the second oil pump comprises decreasing a rotation speed of the second oil pump based on the working fluid pressure,
wherein the determination that the total flow of (i) working fluid discharged from the first oil pump and (ii) working fluid discharged from the second oil pump is equal to or greater than the pressure regulation limit of the pressure regulating valve is based on the rise in working fluid pressure caused by the pressure regulation limit of the pressure regulation valve.

* * * * *